United States Patent [19]
Otsuka

[11] Patent Number: 5,109,513
[45] Date of Patent: Apr. 28, 1992

[54] INTERRUPT CONTROL CIRCUIT FOR MULTI-MASTER BUS

[75] Inventor: Shoichi Otsuka, Yamanashi, Japan

[73] Assignee: Fanuc Ltd., Yamanashi, Japan

[21] Appl. No.: 457,795

[22] PCT Filed: May 24, 1989

[86] PCT No.: PCT/JP89/00517
§ 371 Date: Dec. 18, 1989
§ 102(e) Date: Dec. 18, 1989

[87] PCT Pub. No.: WO89/11697
PCT Pub. Date: Nov. 30, 1989

[30] Foreign Application Priority Data
May 24, 1988 [JP] Japan .................. 63-124935

[51] Int. Cl.⁵ .............................. G06F 13/14
[52] U.S. Cl. .................. 395/725; 364/DIG. 1; 364/221.7; 364/230.2
[58] Field of Search ............... 364/DIG. 1, DIG. 2

[56] References Cited
U.S. PATENT DOCUMENTS

| | | | |
|---|---|---|---|
| 4,420,806 | 12/1983 | Johnson, Jr. et al. | 364/200 |
| 4,796,176 | 1/1989 | D'Amico et al. | 364/200 |
| 4,803,613 | 2/1989 | Kametani et al. | 364/132 |

FOREIGN PATENT DOCUMENTS
62-80752 4/1987 Japan .

Primary Examiner—Gareth D. Shaw
Assistant Examiner—Kakali Chaki
Attorney, Agent, or Firm—Armstrong, Nikaido, Marmelstein, Kubovcik & Murray

[57] ABSTRACT

In an interrupt control circuit for use with one of a plurality of modules connected to a multi master bus (12) which accepts an interrupt request from another module through a multi-master bus (20), an interrupt vector number is generated corresponding to an interrupt source, and is sent to a CPU (22) within the module. In addition to a conventional first vector number generating circuit (18) the control circuit includes a second vector number generating circuit (16) which transforms a vector number ($N_2$) corresponding to a kind of interrupt when the first vector number ($N_1$), which the first vector number generating circuit generates, coincides with the vector number corresponding to an external interrupt signal, so that a different vector number depending on a kind of interrupt source in another module can be generated, so that a decision process to determine an interrupt source in the module by software becomes unnecessary, and reduction of software processes, especially overhead of real-time monitoring, is realized.

2 Claims, 6 Drawing Sheets

| ADDRESS | CONTENT |
|---|---|
| a — 0 0 0 1 0 0 0 0 0 | 0 0 1 0 0 0 0 0 |
| b — 0 0 0 1 0 0 0 0 1 | 0 0 1 0 0 0 0 1 |
| ⋮ | ⋮ |
| c — 1 0 0 0 0 0 0 0 1 | 0 0 1 1 0 0 0 0 |
| d — 1 0 0 0 0 0 0 1 0 | 0 0 1 1 0 0 0 1 |
| ⋮ | ⋮ |

INTERRUPT CONTROL CIRCUIT FOR MULTI-MASTER BUS

DESCRIPTION

1. Technical Field

This invention relates to an interrupt control circuit for a multi-master bus, more particularly, an interrupt control circuit adapted to a multi-master bus suitable for a multi-processor system for the realization of FA (factory automation).

In the field of FA using NC machine tools, recently, a complicated and advanced controls such as visual monitoring of controlled objects, for example, tools and robots, with a television camera, analyzing the monitored image using an image analyzing apparatus, and feeding back information to the controller, has been realized. As a method for rapidly carrying out this complicated and advanced control, a technique of connecting a plurality of processors to each other by a multi-master bus has been employed in order to distribute the overall process among the processors to reduce the load on each processor, and to have rapid communication between the processors. The interrupt control circuit of the present invention is provided for a multi master bus suitable for a system realizing complicated and advanced FA by connecting a plurality of processors to each other by a multi-master bus.

2. Background Art

In a system where a plurality of processors or modules is connected to each other by a multi-master bus, transmission or exchange of an interrupt signal from one processor or module to another is performed through a multi-master bus. In this case, an interrupt control circuit for each module comprises a bus interface and a vector number generating circuit. The bus interface includes an interrupt status register provided at least on a one-to-one basis in each module for exchanging interrupt signals and for delivering the interrupt signals to each other. Namely, a bus interface belonging to a module trying to effect an interrupt responds to a command from a CPU belonging to the module and outputs a control signal to be written in a predetermined bit in an interrupt status register of a bus interface belonging to a module being addressed. This signal is output during a bus not busy state in the multi-master bus and reaches the bus interface of the addressed module through the multi-master bus. If any bit of the interrupt status register of the bus interface becomes 1 (true), the OR of all the bits becomes 1, which is then input into the vector number generating circuit. In addition to the signal from the bus interface, interrupt signals from input/output circuits, etc., which the CPU directly drives, are input into the vector number generating circuit. The vector number generating circuit outputs an interrupt signal to the CPU when one of its input terminals becomes 1.

In the case of an interrupt from other modules in the interrupt control circuit having this construction, software processes for reading out the content of the interrupt status register and branching in response to the content are necessary, and therefore, considerable time is necessary for the software processes.

Generally software is divided into several tasks according to the gist of the processes, and event-driven type real-time processing is executed under management of a real-time monitor which manages the tasks. In this case, an increase in the processing time of the interrupt processing software leads to an increase in overhead time, and the ability of the overall system is decreased remarkably.

DISCLOSURE OF THE INVENTION

It is an object of the present invention to improve on the aforementioned drawbacks in the conventional interrupt control circuit used in an FA system wherein a multi-master bus connects plurality of processors to each other so as to increase performance of the overall system.

This object is carried out by an interrupt control circuit for a multi-master bus accepting various kind of interrupt requests including external interrupt requests from other modules, through a multi-master bus connecting numerous modules, including a plurality of bus masters, to each other and generating interrupt vector numbers corresponding to the kind of interrupt requests to be sent to a bus. The control circuit comprises a bus interface for generating an external interrupt signal representing the occurrence of an interrupt request from another module, and an interrupt status signal representing the kind of interrupt source in reply to the external interrupt request, and a first vector number generating circuit for accepting a true interrupt signal when any of the plurality of interrupt signals, including the external interrupt signal, is true, and generating a first vector number corresponding to the accepted interrupt signal.

The interrupt control circuit further comprises a second vector number generating circuit for generating a second vector number corresponding to each state of the interrupt status signal to be sent to the bus when the first vector number is a vector number which corresponds to the external interrupt signal, and generating a vector number which is the same as or corresponds to the first vector number to be sent to the bus when the first vector number is not a vector number which corresponds to the external interrupt signal.

BEST MODE OF CARRYING OUT THE INVENTION

Figure 1:
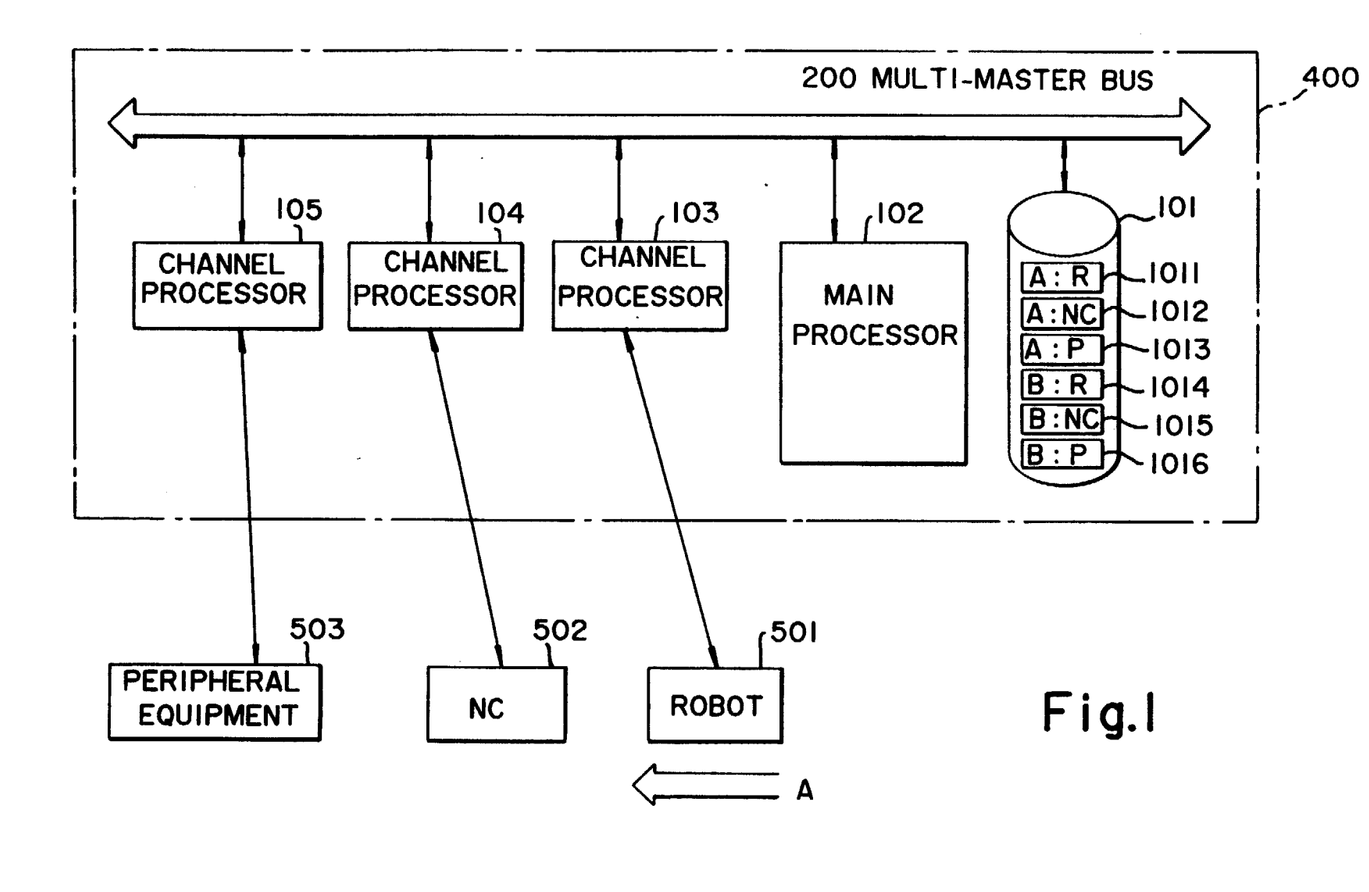
FIG. 1 is a diagram representing an example of an FA system using a multi-master bus.

FIG. 1 is a block diagram representing an example of an FA system constructed utilizing a multi-master bus. This figure represents one of a plurality of working cells, which are the minimum units of automatic operation in a factory automated (FA) machining plant.

In this figure, NC machine tool 502 processes work according to a given NC program. Robot 501 catches unprocessed work on a cargo receiving stand, carries it to a predetermined position within the NC machine tool 502, and sets it, or carries processed work from the NC machine tool 502 to the cargo receiving stand. Peripheral equipment 503 is, for example, a PLC (programmable logic controller) for controlling the cargo receiving stand.

These apparatuses are systematically joined together by being connected to a cell controller 400 and a so-called group control is carried out to execute a planned machining process automatically and continuously.

For example, in the case of continuously carrying out a machining process of type "A" in this working cell, a program is stored in a peripheral storage 101 in the cell controller 400 in the form of a program 1011 of A for the robot 501, a program 1012 of A for the NC machine tool 502, and a program 1013 of A for the peripheral equipment 503.

When the process is changed to the machining process "A" in a working cell where a machining process of another kind, for example, "B" has been in progress, a main processor 102 in the cell controller 400 reads out the program 1011, 1012, and 1013 from the peripheral storage 101 and transfers them to each apparatus before changing the process.

In this case, if the main processor 102 transfers the programs to each apparatus 501 to 503 with the timing of the transfer being controlled by the main processor 102 itself, the load on the main processor 102 becomes too large, so that other jobs are seriously influenced. Therefore, it is preferable that this kind of job be performed in channel processors 103 to 105 assigned to each apparatus on a one-to-one basis or one processor to a plurality of apparatuses, and that the main processor 102 mainly and merely instructs each of the channel processors.

In this case, the channel processor which is instructed by the main processor 102 requests use of a bus from a multi-master bus 200 and if allowed, it reads out a predetermined program from the storage 101 through the multi-master bus 200 and transfers it to each apparatus 501 to 503 in synchronization with the apparatuses 501 to 503. In this case, the instruction from main processor 102 to each channel processor 103 to 105, a report from each channel processor 103 to 105 to the main processor 102 regarding completion of the transfer, and other actions are performed by interrupt processes through the multi-master bus 200.

Figure 2:
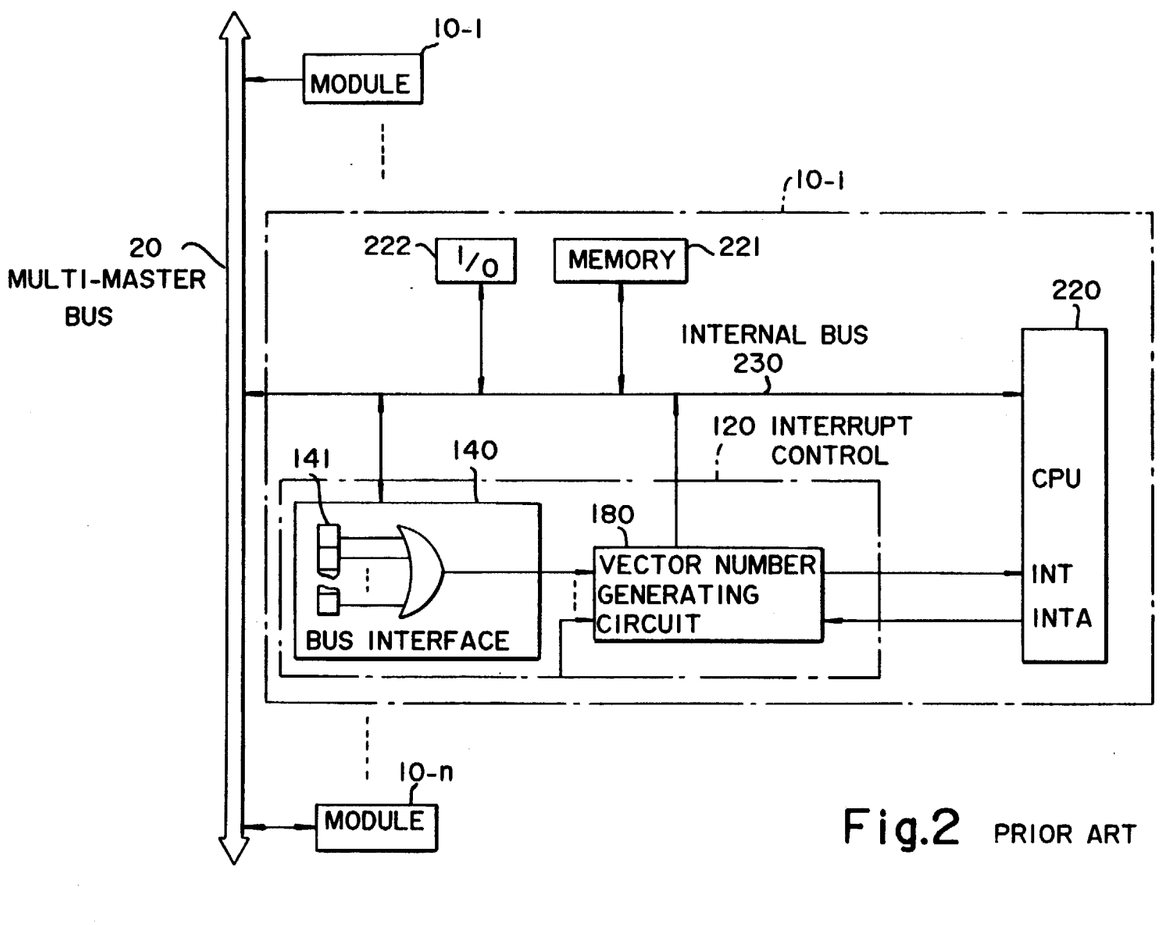
FIG. 2 is a diagram representing an example of a conventional interrupt control circuit for a multi-master bus.

FIG. 2 is a diagram representing an example of a conventional interrupt control circuit for realizing this kind of interrupt process.

An interrupt control circuit 120 within one module 10-i of a plurality of modules 10-1 to 10-n connected to each other through a multi-master bus 20 is provided with a bus interface 140 and a vector number generating circuit.

The bus interface 140 includes at least one interrupt status register 141 in each module 10-1 to 10-n for exchanging interrupt signals, and which mediates the interrupt signals between modules. Namely a bus interface 140, belonging to the module generating an interrupt, outputs a control signal according to an instruction from the CPU 220 belonging to that module to write information in a predetermined bit of the interrupt status register 141 within the bus interface 140 belonging to the addressed module. This signal is output during a not busy time of the bus in the multi-master bus 20 and reaches the bus interface of the addressed module through the multi-master bus 20.

When any bit of the interrupt status register 141 within the bus interface 140 becomes 1 (true), the OR of the all bits becomes 1, which is input to the vector number generating circuit 180.

In addition to the signals from the bus interface 140, interrupt signals from input/output circuits, etc., which the CPU 220 directly drives, are input to the vector number generating circuit 180. The vector number generating circuit 180 outputs an interrupt signal INT to the CPU 220 when one of its input terminal becomes 1. When an INTA signal is output from CPU 220 in reply to the interrupt signal INT, the vector number generating circuit 180 outputs a vector number depending on the kind of interrupt received.

The CPU 220 reads the vector number through a bus 230, takes out an interrupt vector which is an initial address of an interrupt processing program from a memory 221 according to the vector number, and branches to that address.

As a program for processing an interrupt from another module is initiated, according to the program, the CPU 220 reads out the content of the interrupt status register 141 from the bus interface 140 through the bus 230 to recognize the kind of module which interrupts or the kind of interrupt source, and then makes a further process branch.

Thus, in the case of generation of the interrupt from another module, it is necessary to read out the content of the interrupt status register 141 and to branch according to the content by a software process, and therefore it takes considerable time to process by software.

Figure 3:
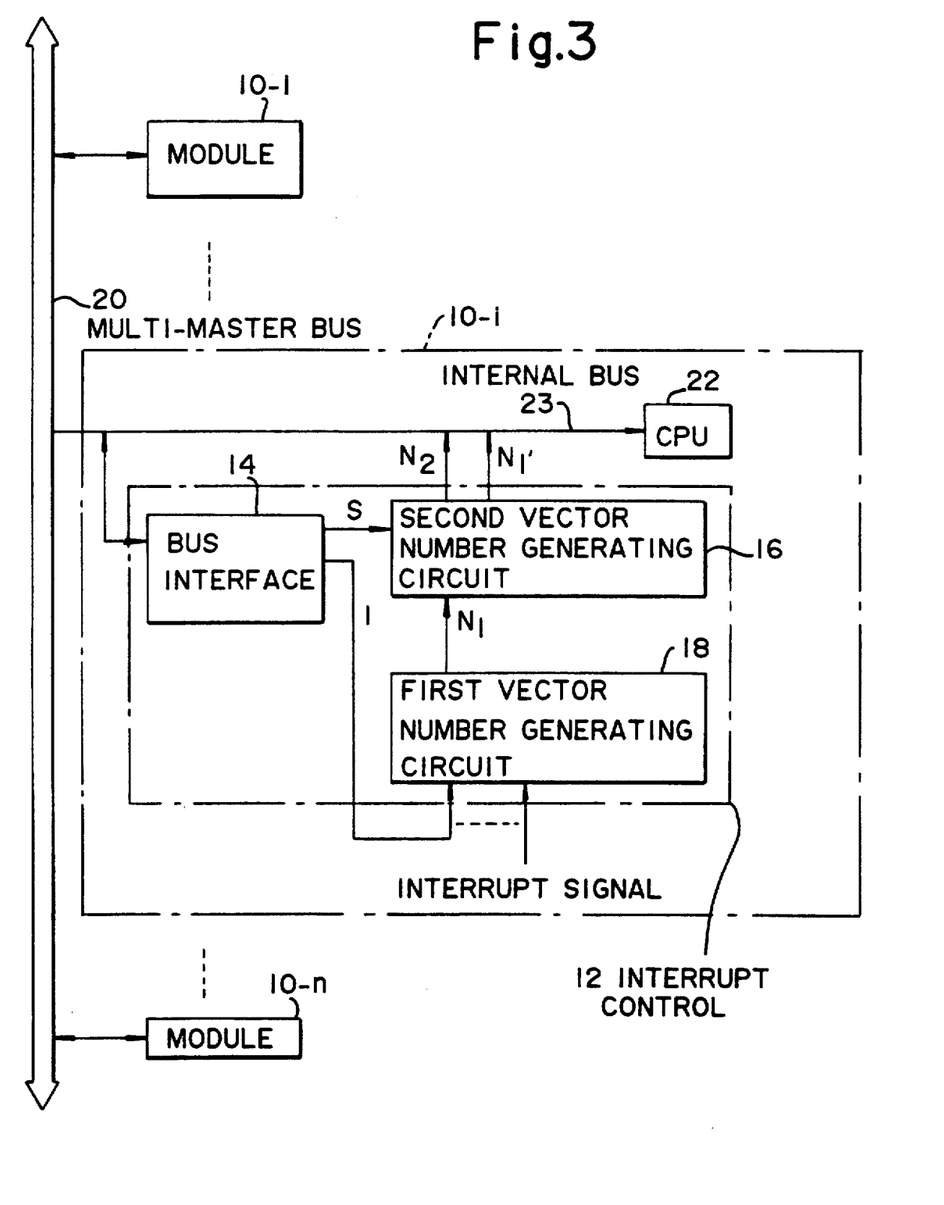
FIG. 3 is a diagram representing a basic construction of the present invention.

FIG. 3 is a diagram representing a basic construction of the present invention. In this figure, a multi-master bus 20 connects numerous modules 10-1 to 10-n, including a plurality of bus masters (processors), to each other and comprises numerous signal lines to transfer data rapidly between the bus masters and between the other modules and the bus master by successively giving priority use of the bus to one of the bus masters according to predetermined rules under arbitration of the bus masters. An interrupt control circuit 12 provided in each module or in some modules receives an external interrupt request which is an interrupt request from another module 10-1 to 10-i−1 or 10-i+1 to 10-n other than the module 10-i which it belongs to and generates an interrupt vector number corresponding to the interrupt source to provide to the bus 23, and the interrupt control circuits 12 comprises a bus interface 14 for generating an external interrupt signal I representing generation of the interrupt request from another module and an interrupt status signal S representing a kind of interrupt source in reply to the external interrupt request and a first vector number generating circuit 18 for accepting one of the true interrupt signals and generating a first vector number $N_1$ corresponding to the accepted interrupt signal when any signal of the plurality of interrupt signals, including the external interrupt signal I, becomes true.

In addition to the above construction, an interrupt control circuit for a multi-master bus further comprises a second vector number generating circuit 16 which generates a second vector number $N_2$ corresponding to each status of the interrupt status signal S and sends it to the bus 23 when the first vector number $N_1$ is a vector number corresponding to the external interrupt signal I, and which generates a vector number $N_1'$ being the same as or corresponding to the first vector number $N_1$, and sends it to the bus 23 when the first vector number $N_1$ is not a number corresponding to the external interrupt signal I.

As even in the case of interrupt from another module 10-1 to 10-i−1 or 10-i+1 to 10-n, the second vector number generating circuit 16 generates a different vector number $N_2$ in reply to the interrupt status signal S, branching to individual interrupt processing software corresponding to the interrupt source is performed by hardware. Therefore, as it is not necessary to examine the interrupt source by software, processing time is shortened by that time.

Figure 4:
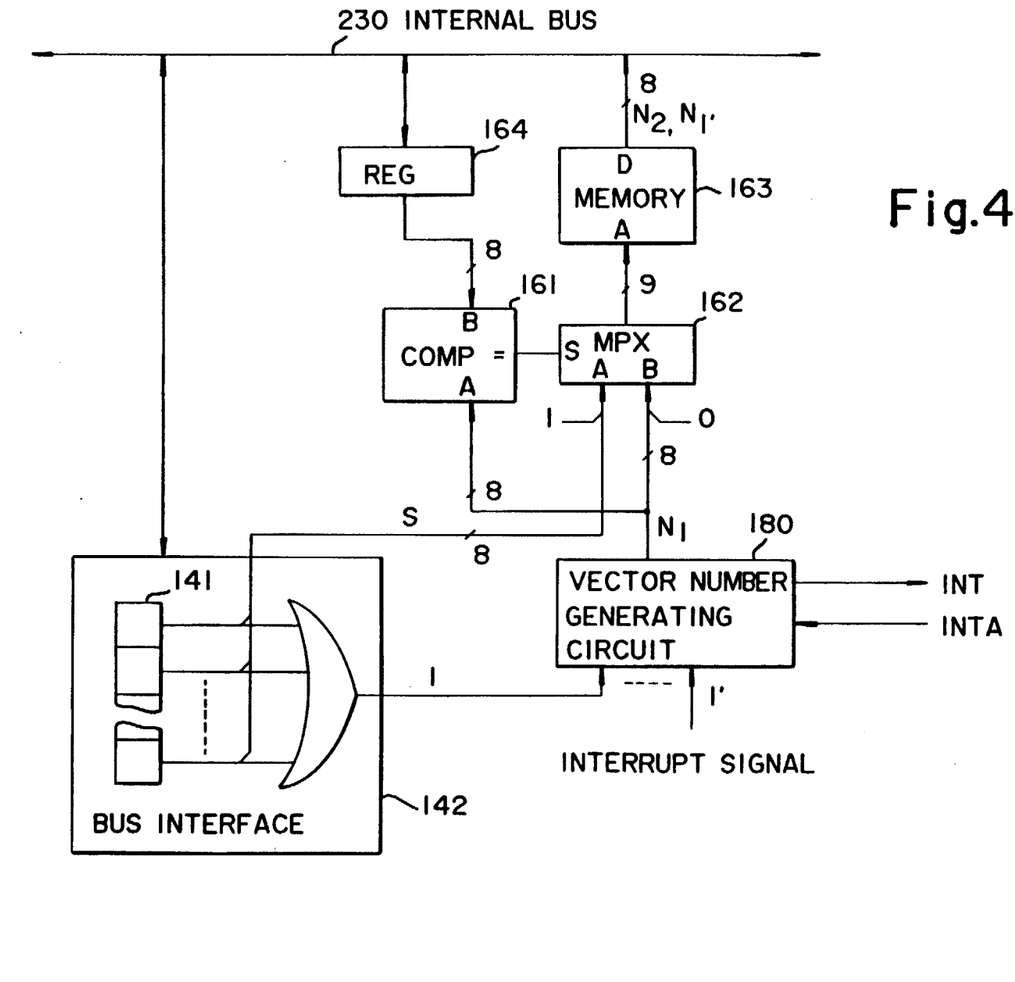
FIG. 4 is a diagram representing a first embodiment of the interrupt control circuit for the multi-master bus according to the present invention.

FIG. 4 is a diagram representing the first embodiment of the interrupt control circuit for the multi-master bus according to the present invention. In this figure, only the interrupt control circuit and the bus 230 are shown.

A bus interface 142 is similar to the bus interface 140 described referring to FIG. 2, but reading out from the interrupt status register 141 is carried out not through the bus 230 by software, but through a signal line S representing the content thereof. Although there are eight signal lines in this figure, this may be decided according to the number of kinds of external interrupts. Vector number generating circuit 180 is the same as in FIG. 2. An external interrupt vector reference register 164 is a ROM or a write enable memory which is connected to the bus 230 as shown in the figure and is write enabled from the CPU side, storing a vector number which is the same as the number which the vector number generating circuit 180 generates in reply to the external interrupt signal I. Memory 163 is a ROM or a write enable memory an address input of which is also connected to the bus 230 though unspecified and which is write enabled from the CPU side, storing a vector number as described later. A comparator 161 compares an input "A" with an input "B" and makes a terminal "=" "true" when both inputs are coincident. A multiplexer 162 selects either input "A" or "B" depending on the logic status of a select terminal "S" and outputs a selected value. The input "A" is connected to a bit representing a logic "1" in addition to the output S of the bus interface 142, and the input "B" is connected to a bit representing a logic "0" in addition to the signal lines $N_1$ for vector number output from the vector number generating circuit 180.

In the case where the external interrupt vector reference register 164 is not the aforementioned ROM but a write enable memory, similar contents are written previously when a software program is started. Predetermined contents are also written in memory 163 if it is not ROM.

If an interrupt from another module is generated, namely, one bit of the interrupt status register 141 within the bus interface 142 becomes "1", the external interrupt signal I then becomes 1 and the vector number generating circuit 180 outputs the vector number $N_1$ based on prewritten data. The comparator 161 compares this $N_1$ with the content of the external interrupt vector reference register 164. If the interrupt came from another module, the comparator 161 outputs a logic "1" because both of the inputs must be coincident. The multiplexer 162 then selects input "A" and outputs it. Then, the content addressed by an address input "A", namely, the output of multiplexer 162, in other words, information formed by supplementing a logic "1" in the information of the interrupt status register 141 within the bus interface 142, is output in an output "D" of the memory 163 and supplied to the bus 230.

On the other hand, if an interrupt other than an external interrupt occurs, namely, if one of the internal interrupt signals I' becomes logic "1", the vector number generating circuit 180 generates a vector number corresponding to it. In this case, as the input "A" and "B" of the comparator 161 are not coincident, its output becomes "0", and the multiplexer 162 then selects the input "B", namely, information formed by supplementing a logic "0" in the vector number $N_1$ output by the vector number generating circuit 180, and supplies it to the bus 230.

Figure 5:
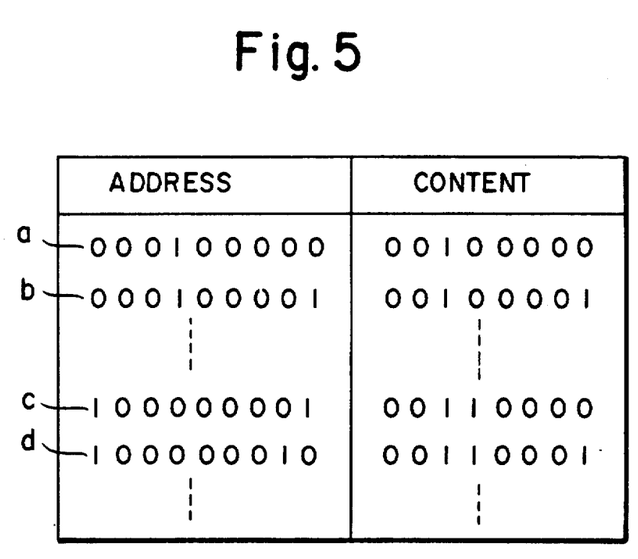
FIG. 5 is a diagram representing an example of a content of a memory 163 shown in FIG. 4.

FIG. 5 shows an example of the contents stored in memory 163. The most significant bit of the nine bits of the address corresponds to "0" or "1" which is supplemented in the input of the multiplexer 162. The other eight bits correspond to each bit of the interrupt status register 141 within the bus interface 142 or the vector number $N_1$ which the vector number generating circuit 180 outputs.

Therefore, if an interrupt from another module occurs and a bit of the interrupt status register 141 corresponding to the least significant bit of memory 163 is set to "1", then through the aforementioned process, the address c in FIG. 5 is selected and its content 00110000 is output. If an interrupt corresponds to the next less significant bit of memory 163, d is selected in a similar manner and 00110001 is output.

On the other hand, if one of the internal interrupt signals I' becomes logic "1" and the vector number generating circuit 180 outputs 00100000 as a vector number, the value shown in FIG. 5 a is selected and 00100000 is output. If the vector number generating circuit 180 outputs 00100001, 00100001 is output from memory 163 and supplied to the bus 230. As seen in this example, the vector number which the vector number generating circuit 180 outputs, and the vector number which the memory 163 outputs, may be the same or different on condition that they correspond to each other on a one-to-one basis.

Figure 6:
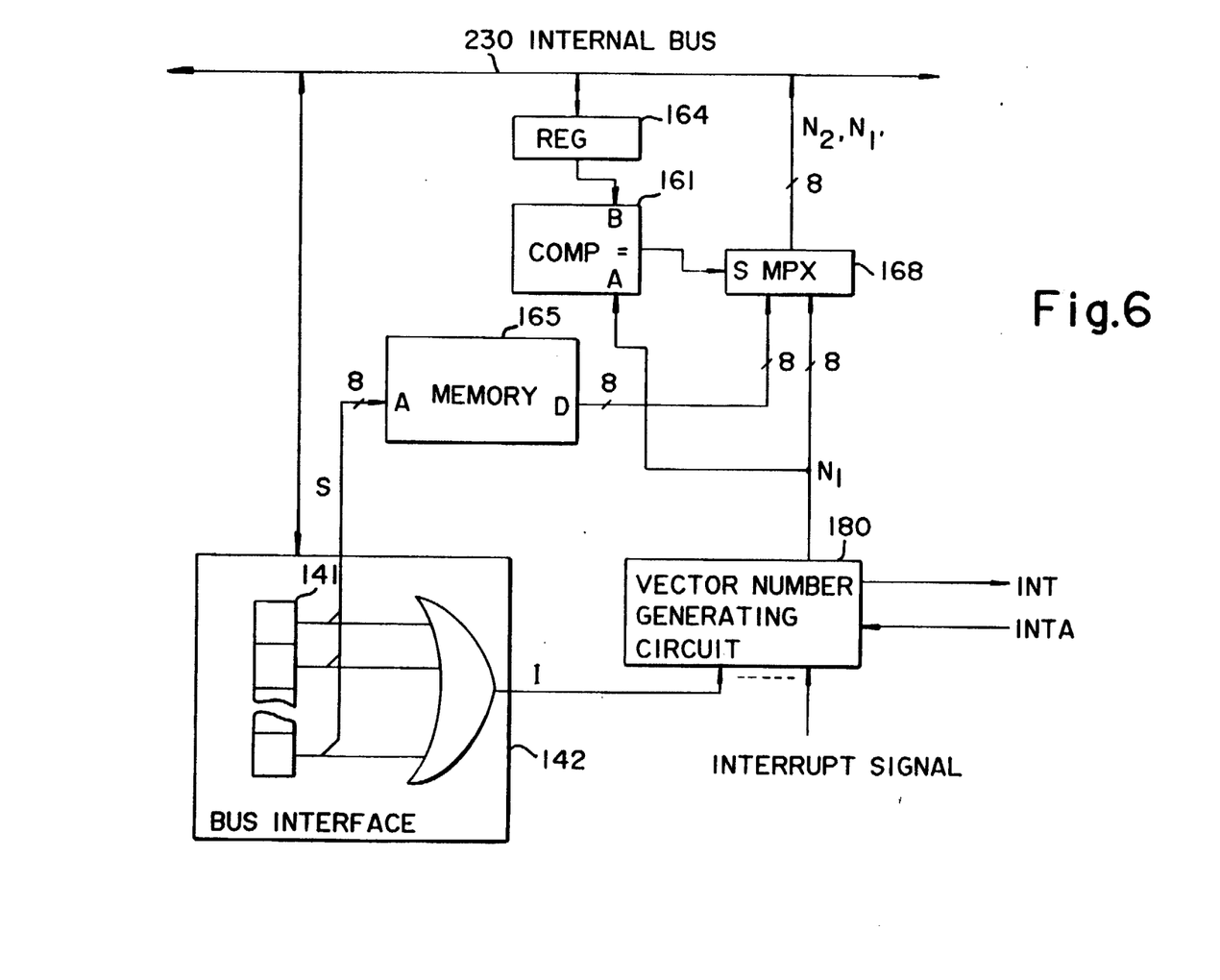
FIG. 6 is a diagram representing a second embodiment of the interrupt control circuit for the multi-master bus according to the present invention.

FIG. 6 is a diagram representing the second embodiment of the interrupt control circuit for the multi-master bus according to the present invention. In this figure, a bus interface 142, a vector number generating circuit 180, a comparator 161, and an external interrupt vector reference register 164 are the same as in FIG. 4 and their operations are also the same.

The first different matter from the circuit of FIG. 4 is the position of the memory 165. Namely, the output of the multiplexer 168 is connected directly to the bus 230, and the output S of the interrupt status register 141 is transformed in the memory 165 and input to the multiplexer 168. The multiplexer 168 selects either the vector number which is output from the memory 165 or the output of the vector number generating circuit 180, and sends it to the bus 230. The structure of the memory 165 is such that the most significant address bit "1" is removed in FIG. 5 c, d.

As mentioned above, the interrupt control circuit for a multi-master bus according to the present invention outputs a different vector number corresponding to the kind of interrupt source even if the interrupt comes from another module, so that it is not necessary to examine the interrupt source by software, an overhead time is reduced in event-driven real-time processing, and the performance of a system is raised.

I claim:

1. An interrupt control circuit in each of at least some of a plurality of modules connected to each other by a multi-master bus, said modules including a plurality of bus masters, said interrupt control circuit accepting different types of interrupt requests including external interrupt requests which are received through said multi-master bus from modules other than the module to which said interrupt control circuit belongs through said multi-master bus, said interrupt control circuit generating interrupt vector numbers corresponding to said different types of interrupt requests to be sent to a bus within the module to which said interrupt control circuit belongs, said interrupt control circuit comprising:

a bus interface generating a) an external interrupt signal representing occurrence of said external interrupt request from another module and b) an interrupt status signal representing a kind of interrupt source in reply to said external interrupt request;

a first vector number generating circuit selecting one of a plurality of true interrupt signals including said external interrupt signal, and generating a first vector number corresponding to a selected interrupt signal when at least one of the plurality of interrupt signals, is true; and a second vector number generating circuit generating a second vector number corresponding to each state of said interrupt status signal from said bus interface to be sent to the bus of said module when said first vector number is a vector number which corresponds to said external interrupt signal generated by said bus interface, and generating a third vector number which is the same as or corresponds to said first vector number to be sent to the bus of the module when said first vector number is not a vector number which corresponds to said external interrupt signal of said bus interface.

2. An interrupt control circuit as claimed in claim 1, wherein said second vector number generating circuit comprises:

an external reference register for storing said second vector number which is the same as the first vector number which said first vector number generating circuit outputs in reply to the external interrupt signal, a comparator for deciding whether the first vector number which said first vector number generating circuit outputs and the second vector number which said external reference register stores are coincident or not, and a multiplexer for selecting said second vector number corresponding to said interrupt status signal to be output when both are coincident and selecting an output of said first vector number generating circuit to output a corresponding third vector number when both are not coincident, depending on the decision result of said comparator.

* * * * *